May 26, 1964 G. DE GELLEKE 3,134,553
TUCKING MEANS FOR A WEB-WINDING MACHINE
Filed Jan. 17, 1961 10 Sheets-Sheet 2

INVENTOR.
GERRIT DE GELLEKE
BY Robert Henderson
ATTORNEY

Fig. 7.

INVENTOR.
GERRIT DEGELLEKE
BY Robert Henderson
ATTORNEY

May 26, 1964  G. DE GELLEKE  3,134,553
TUCKING MEANS FOR A WEB-WINDING MACHINE
Filed Jan. 17, 1961  10 Sheets-Sheet 8

INVENTOR.
GERRIT DE GELLEKE
BY Robert Henderson
ATTORNEY

May 26, 1964

G. DE GELLEKE 3,134,553

TUCKING MEANS FOR A WEB-WINDING MACHINE

Filed Jan. 17, 1961

INVENTOR.
GERRIT DeGELLEKE
BY Robert Henderson
ATTORNEY

May 26, 1964  G. DE GELLEKE  3,134,553
TUCKING MEANS FOR A WEB-WINDING MACHINE
Filed Jan. 17, 1961  10 Sheets-Sheet 10

INVENTOR.
GERRIT DEGELLEKE
BY Robert Henderson
ATTORNEY

United States Patent Office 3,134,553
Patented May 26, 1964

3,134,553
TUCKING MEANS FOR A WEB-WINDING
MACHINE
Gerrit De Gelleke, Troy Hills, Parsippany, N.J., assignor to Cameron Machine Company, Dover, N.J., a corporation of New York
Filed Jan. 17, 1961, Ser. No. 83,229
6 Claims. (Cl. 242—56)

This invention relates to tucking means suitable for use in web-winding machines and, more particularly, relates to improved means for starting a leading end of a web around a rewind core in such a machine so that winding of the web material may be started without the necessity of using glue or other means for affixing the leading end of the web to the core.

Although the present invention may be employed with various types of winding machines, it is disclosed and described herein as employed in a winding machine and with roll-changing mechanisms all as disclosed in considerable detail in my copending application Serial No. 821,395, filed June 19, 1959, now Patent No. 3,030,042, dated April 17, 1962, without, however, limiting this invention to its use with or as a part of that precise kind of winding machine.

It has been common practice, as a first step in machine winding of web material, that the leading end of the web be affixed to a rewind core in the machine, usually by using an adhesive of some kind. The principal object of the present invention is to provide satisfactory means for enabling such winding to be started on a rewind core without the need of using any adhesive or more or less equivalent affixing means.

In some winding operations it has been the practice to start the operation by very carefully setting up one or several turns of web material upon a rewind core in the machine without, however, using any adhesive. To accomplish this, it has usually been necessary for the leading end of the web to be very carefully tucked manually about the rewind roll; and, prior to this invention, satisfactory means for performing this tucking operation mechanically and automatically have not been developed. The present invention comprehends such mechanical means which, preferably, are automatic in operation.

The present invention employs an elongate tucking member which is supported in or on the machine in parallelism with the rewind core and which, while being maintained in parallelism with said core, may be moved toward the latter in order to engage a leading end portion of web material and press it against the core so that, when the latter is turned upon initiation of a winding operation by the machine, the leading end portion of the web will enter a nip area between the rewind core and a winding drum against which said core, with web material thereon, is in frictional driving engagement during a winding operation. As disclosed herein, the mentioned tucking member is supported in the machine for pivotal movement toward the rewind core but it will be obvious from the following detailed description that the tucking member need not necessarily pursue a pivotal or arcuate movement toward the rewind core but may, if desired, be arranged to pursue a straight-line movement into engagement with the leading end portion of the web to press the latter against said core.

Without limiting this invention thereto, the present invention is disclosed herein as applied to a winding machine and roll-changing apparatus all as exhibited in my mentioned copending application. The present disclosure details those parts of such a winding machine and roll-changing mechanism which cooperate directly with the tucking means comprehended by the present invention. If details are desired additional to those set forth in this application, they may be obtained by reference to the mentioned copending application.

In the accompanying drawings.

Figure 1:
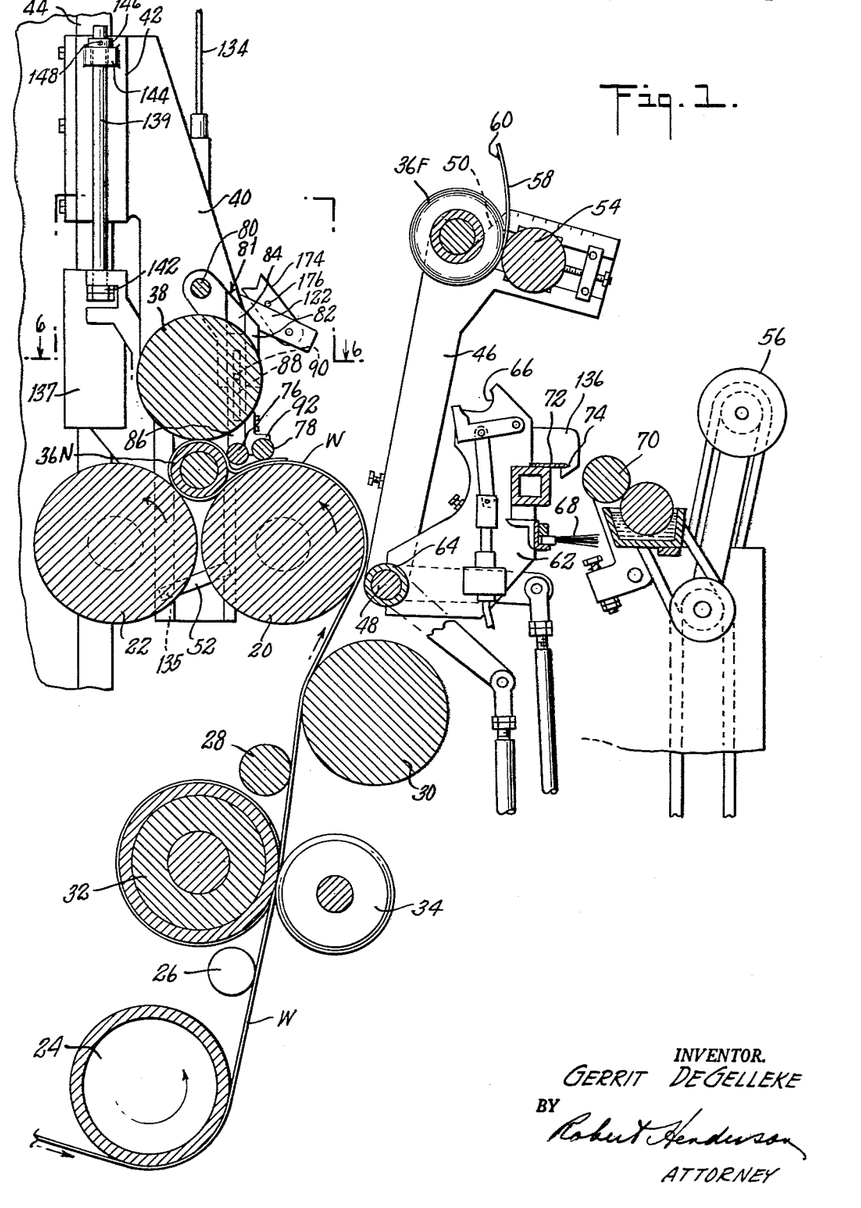
FIGURE 1 is an approximately central, cross-sectional view through various winding drums and rollers of a winding machine having therein a preferred embodiment of tucking means according to this invention; the parts of the winding machine which are shown including all parts which, in one way or another, coact quite directly with the tucking mechanism, and this view shows all such parts as positioned approximately at the beginning of an operation of winding web material upon a new rewind core which has just been inserted in the machine.

A general understanding of the winding machine, in which this invention is illustratively disclosed, may be gained from FIG. 1. A web W, issuing from a supply roll (not shown), moves, in the direction indicated by arrows applied thereto, to a winding assembly consisting principally of an elongate front winding drum 20, and a generally similar, parallel, rear winding drum 22, one or both of these drums being power-driven.

In moving toward the winding assembly, the web is guided by guide or idler rollers 24, 26, 28 and 30 and, ordinarily, is processed in some manner, as, for example, by being slitted by cutting engagement between a rotary mandrel 32 and a circular, rotary slitting knife 34, the purpose of the slitting being to convert the web from the form of a single broad web to plural, relatively narrow webs. As all these narrow webs are similarly handled by the diclosed machine, these webs hereinafter are referred to in the singular number.

Upon reaching the winding assembly, the web W first contacts the drum 20, passing in front of and over the latter, thence under and almost completely around a new rewind core 36N between each of drums 20, 22 and said core which rests between and upon and, preferably, is held down upon said drums to derive winding rotation frictionally from the turning of the drums. In some circumstances, it is acceptable practice to have a light line of adhesive applied to the new core 36N so that a leading portion of the web will adhere to the core to facilitate the commencement of the operation of winding the web upon the core; but the present invention permits web winding without the need for applying adhesive to the new core.

The illustrated winding machine includes a horizontal, rotatable riding roll 38, borne at its ends in suitable bearings in similar carriages 40 having guiding portions 42, at their upper ends, slidable vertically upon and guided by stationary upright guide members 44 of the winding machine. Thus, the riding roll 38 may rise in continued riding engagement with web material accumulating upon the rewind core 36N. The carriages 40 and the riding roll 38 may also be raised and lowered independently of the rewind core 36 in a manner and for purposes hereinafter explained.

The tucking means, according to this invention, although capable of functioning quite independently of means, either manual or automatic, for changing cores in the machine, may be employed very advantageously to operate in conjunction with automatic core-changing means such as are disclosed, for example, in my said copending application; and are illustrated and will now be described as utilized with the latter arrangement.

As may be understood in more detail from said copending application, the core-changing mechanism comprises a pair of substantially similar unload arms 46 arranged to work similarly in unison by being keyed at their lower ends upon opposite ends of a horizontal rock-shaft 48 which is parallel to the axes of drums 20 and 22 as well as to several rolls in the machine. These arms are pivoted mechanically, through rocking of the rock-shaft 48 by crank means (not shown), between a "full-in" position and a "full-out" position.

Said "full-in" position of arms 46 is one in which slots 50, near the upper ends of said arms, underlie and are in vertical alignment with opposite end portions of a filled core (sometimes hereinafter referred to as a filled core or roll 36F) which, upon being filled by winding to the desired extent, has been raised by vertical lifters 52. These lifters are arranged to engage beneath opposite end portions of a filled roll 36F, when the latter is still in winding engagement with the drums 20 and 22, and lift said filled roll veritcally to a sufficient extent that the ends of arms 46 and, more particularly, the slots 50 therein may pass leftwardly (as viewed in FIG. 1) to points directly below the ends of the filled roll to receive the latter when lowered thereinto. The lifters 52 have operating means (not fully shown) for raising and lowering them to lift a filled rewind roll 36F substantialy from winding position and then to lower said roll into the slots 50.

In FIGS. 1-5, the arms 46 (only one being in view) are illustrated in what may be termed a "half-out" position which they may occupy throughout a tucking operation as hereinafter described. In a "full-out" position of the arms 46, they would be considerably rightward of the position in which they are illustrated in FIGS. 1-5, and in this "full-out" position a web-holding roller 54 is turned by a suitably driven wheel or roller 56 to press a trailing end portion 58 of the web tightly against an underlying turn of the web on the filled rewind roll 36F. This trailing end portion may have adhesive 60 applied thereto, in a manner hereinafter explained, to hold it securely to the underlying turn of the web.

The core-changing mechanism also comprises a pair of substantially similar load arms 62 (only one being shown in each of FIGS. 1-5) arranged to work similarly in unison by being welded, keyed or otherwise fixed at their inner or lower ends upon opposite ends of a horizontal, tubular rock-shaft 64 borne upon rock-shaft 48 for rocking motion relatively to the latter's axis. The load arms are pivoted mechanically, in unison, through rocking of the tubular rock-shaft 64 by crank means (not shown).

Figure 2:
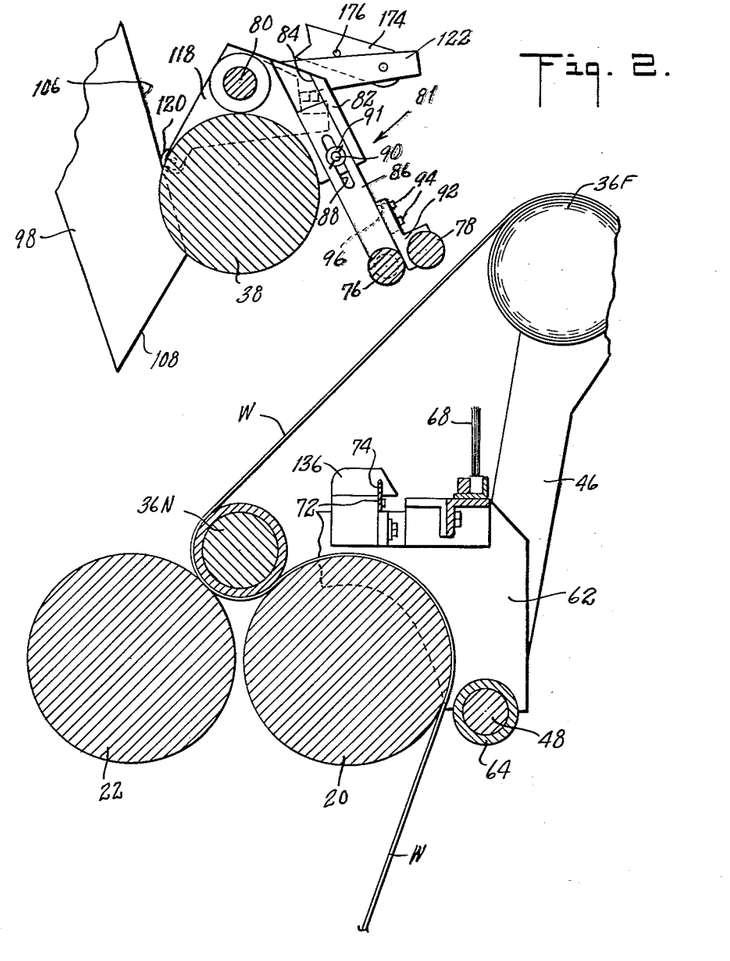
FIG. 2 is an enlarged diagrammatic representation of certain parts of the mechanism illustrated in FIG. 1, the parts, however, being positioned as they would be shortly before the condition shown in FIG. 1, i.e., after a new rewind core has been inserted in the machine and before an intervening web portion between the new core and a previously filled rewind core has been severed.
Figure 3:
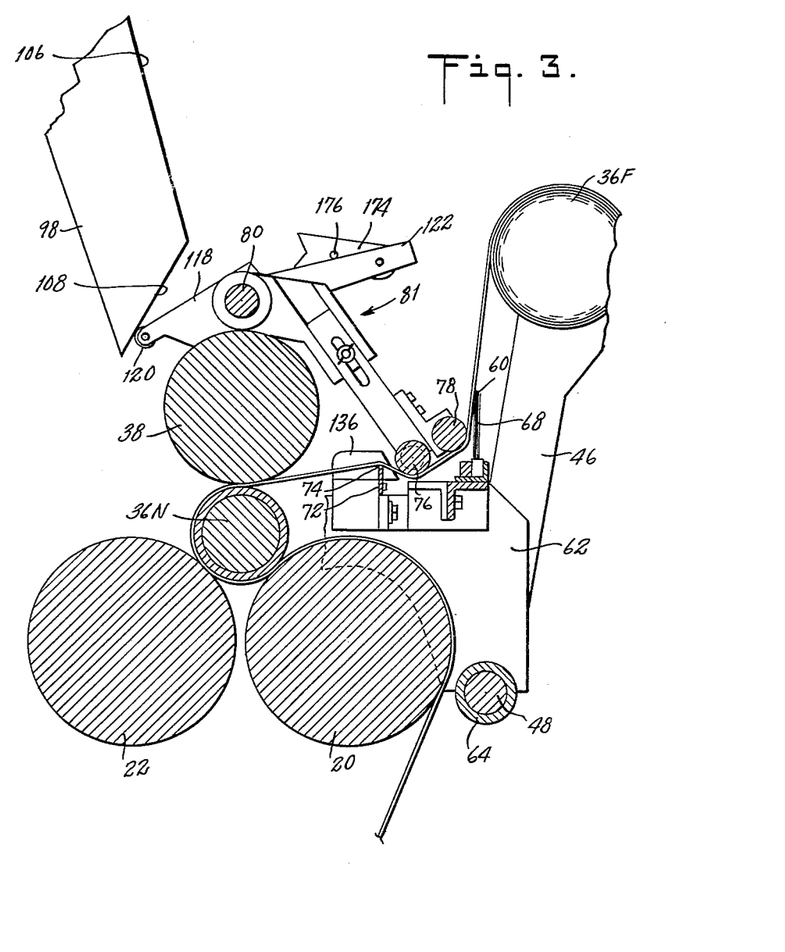
FIG. 3 is a view substantially along the lines of FIG. 2 but showing the various parts as they would be at the instant of severance of the mentioned intervening web portion.

Each of the load arms 62 is provided with a closable jaw 66 into which a new rewind core may be placed when the arms 62 are in their outer position as shown in FIG. 1, and said arms may then be pivoted counterclockwisely, to their inner position shown in FIGS. 2 and 3, to move said new core into winding position upon the winding drums 20 and 22 after a previously filled core has been removed by the arms 46 from said winding position. In being moved to and from said outer position, an elongate brush 68, fixed to the two load arms 62, engages a glue-applying roller 70 to receive glue therefrom and apply it as at 60 to the trailing end of web on a filled rewind core 36F in a manner hereinafter described. An elongate knife 72 with a cutting edge 74 which, preferably, is serrated, is also fixed to the two load arms 62 and operates to cut the web at the end of a filled rewind roll 36F in a manner hereinafter described.

Tucking means according to this invention, particularly with reference to the first embodiment illustrated in FIGS. 1-7, comprise a pair of tucking rollers 76 and 78 preferably having surfaces of relatively high friction material such as, for example, rubber. These tucking rollers are carried in parallelism to the winding drums 20 and 22 and to a new or bare core 36N supported in winding position between and upon said drums. The tucking rollers are thus held by being mounted upon the lower end of a pair of similar, pivotal, suspension arms 81 which are keyed to opposite ends of a horizontal rock-shaft 80; and this shaft extends cross-wisely of the machine and is rockably borne at a position above the riding roll 38 in similar, suitable bearings in the two carriages 40 of the riding roll.

Each of the suspension arms 81 comprises an elbow 82 an upper part of which is keyed to the rock shaft 80. A lower part of said elbow is formed with a groove 84 which, during a tucking operation, usually extends vertically or more nearly vertically than horizontally. The groove 84 extends into the upper part of the elbow 82 and preferably is open at both ends. Slidably mounted within the groove 84 is a slide member 86 an upper portion of which is provided with a longitudinal slot 88 through which extends a headed locking bolt 90 disposed non-adjustably within a suitable bolt hole in the lower portion of the elbow 82. A wing nut 91 or equivalent nut on bolt 90, when loose, permits the slide member 86 to be slid upwardly or downwardly to a desired adjusted position in groove 84, but said nut, when tightened, serves, with said bolt, to lock the slide member in such an adjusted position in a well-understood manner.

The tucking roller 76 is borne, at its ends, for rotation within suitable bearings at the lower ends of the slide members 86 while the tucking roller 78 is borne, at its ends, for rotation within suitable bearings in lugs 92, in closely spaced, side-by-side relationship to the roller 76. As best seen in FIG. 2, each lug 92 is secured tightly upon a related slide member 86 by a pair of headed bolts 94 which extend through a slot 96 and are threaded into the slide member approximately in the position shown in the drawing. The slot 96 is of such length that, when the bolts 94 are loosened, the lugs 92 may be shifted upwardly or downwardly to desired adjusted positions on the slide member 86 and they may, of course, be locked in such adjusted positions by tigthening of said bolts.

Figures 5, 12:
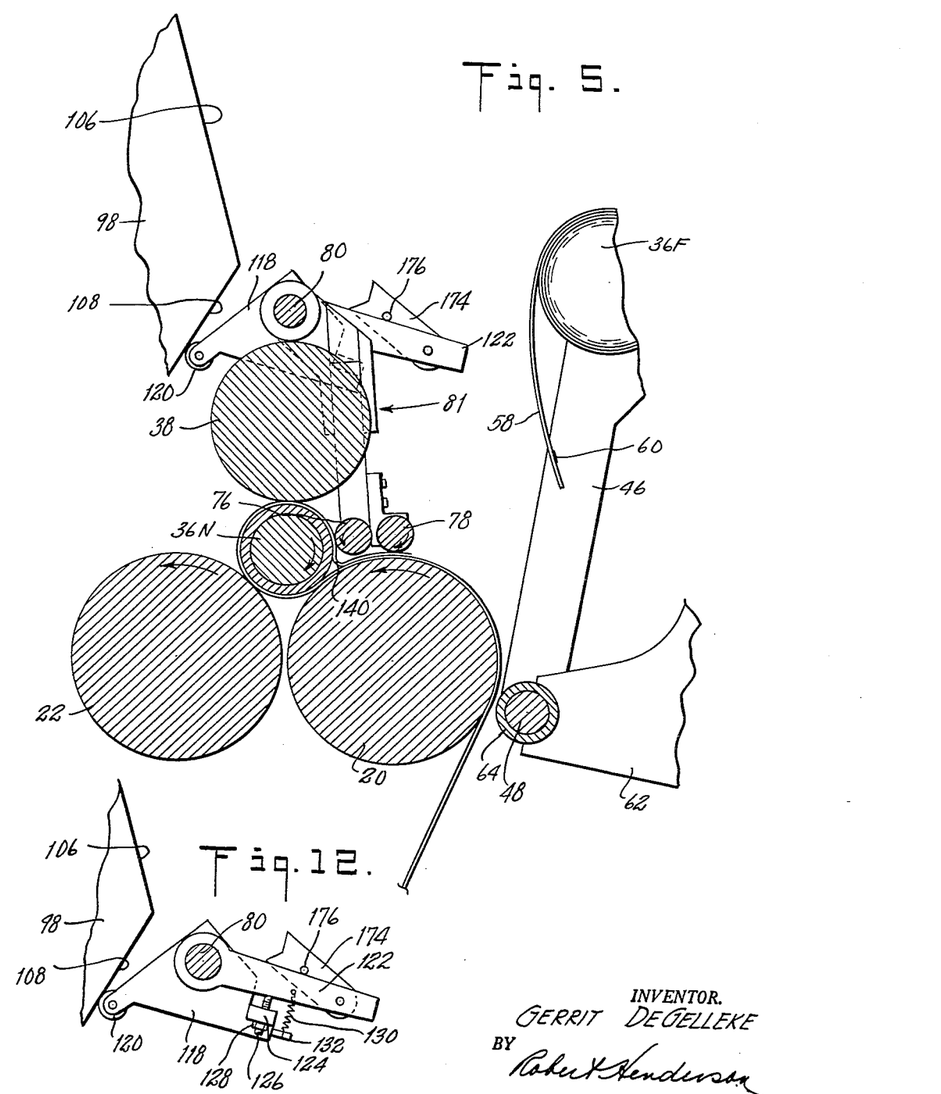
FIG. 5 is a view substantially similar in general to FIGS. 2–4 inclusive but showing a tucking member in position to tuck a severed leading portion of the web partially about a new rewind core so that, when a further operation of winding is started by the winding machine, said leading portion will wind about the core and, thus, enable a desired supply of web material to be wound upon the core.
FIG. 12 is a fragmentary side view of a cam arrangement and a related abutment member which may be swung to inoperative position, if the tucking means of the first embodiment are employed or may be swung to an operative position if the second embodiment is employed, in connection with which operative position means are provided for precisely limiting the extent to which the tucking member may move toward the new rewind core.
Figure 6:
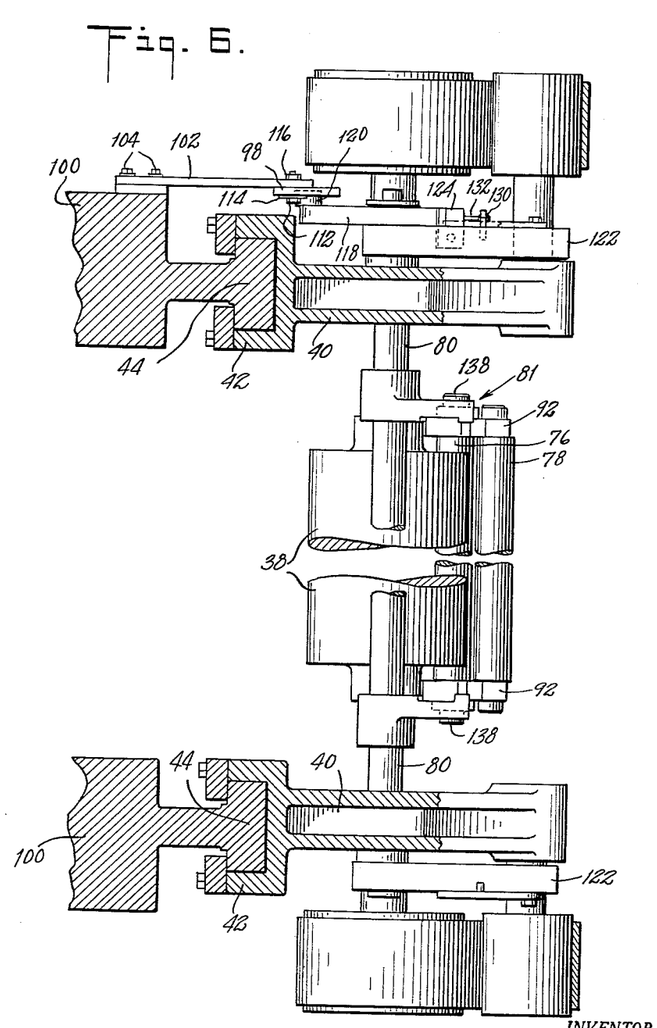
FIG. 6 is an enlarged, horizontal sectional view substantially on the line 6—6 of FIG. 1.
Figure 7:
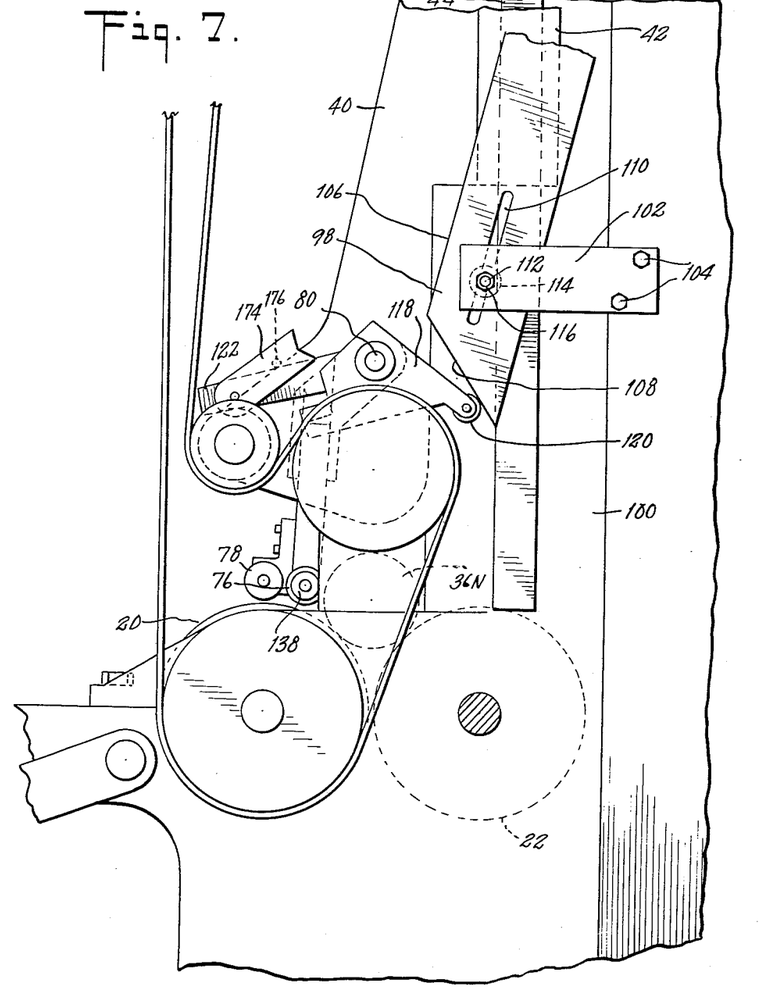
FIG. 7 is an enlarged end view of the tucking mechanism and directly related parts of the winding machine as viewed directly oppositely to the views of FIGS. 1–5.

During a tucking operation, the rollers 76 and 78 are in their positions, indicated in FIGS. 1 and 5, in which the suspension arms 81 are only slightly angular from freely suspended positions.

Figure 4:
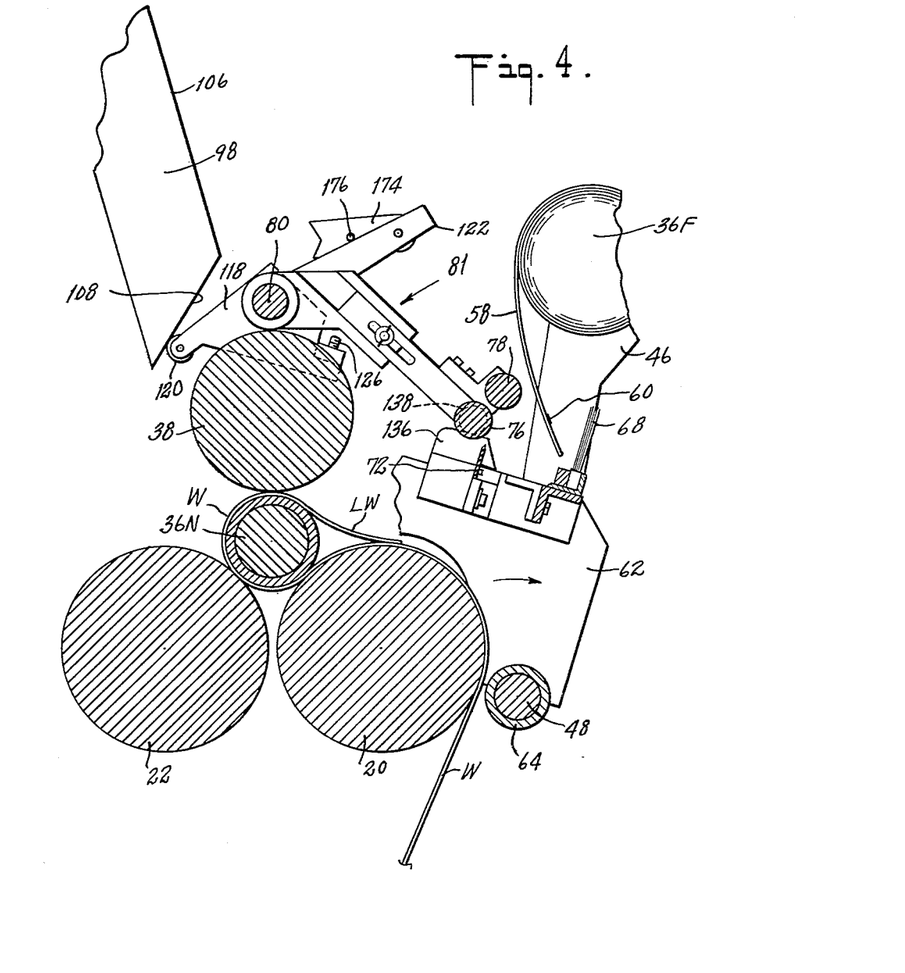
FIG. 4 is a view substantially similar in general to FIGS. 2 and 3 but showing the various parts as they would be positioned shortly after severance of said intervening web portion and before the tucking mechanism is brought into play.

The suspension arms 81 and the tucking rollers, particularly roller 76, are arranged to function in connection with a related web-severing operation as well as for tucking purposes; and, for the web-severing purpose, the arms 81 must swing upwardly to some extent as indicated in FIGS. 2, 3 and 4. Cam means are provided, in association with one of the suspension arms 81, to achieve such upward swinging. These cam means comprise a cam plate 98 (FIG. 7) which is fixed to a side frame member 100 of the machine in a suitable manner as, for example, by a bracket 102 which, in turn, is suitably fixed to said frame member as, for example, by bolts 104.

The cam plate 98 has two cam surfaces 106, 108. To afford some latitude in the disposition of the cam plate 98 and its said cam surfaces, it is formed with a mounting slot 110 extending longitudinally thereof. The plate 98 is held upon the bracket 102 by a single nut-and-bolt arrangement in which a headed bolt 112 extends, preferably outwardly of the machine, through a washer 114 of greater width than the slot 110, thence through said slot, and, with a fairly accurate fit, through a suitable bolt hole in the bracket 102; and a nut 116 is threaded upon the end of the bolt 112, the arrangement being such that, when the nut 116 is loosened, the plate 98 may be slid upwardly or downwardly and/or angularly in relation to bracket 102. When the nut 116 is tightened, the plate 98 is held firmly in its adjusted position upon the bracket 102.

The cam means for swinging the tucking rollers 76, 78 upwardly include, also, a cam-follower plate 118 best seen in FIGS. 1–5, 7 and 12, details thereof being quite completely shown in FIG. 12. The plate 118 is arranged to operate as a bell-crank and it is pivotally mounted, at the juncture of its arms, upon the rock-shaft 80 in such manner as to be rotatable relatively to that shaft; hence, said plate is rotatable relatively to the suspension arms 81 which, as already stated, are constrained to turn with the shaft 80. The follower plate 118 is disposed at that end of shaft 80 which corresponds to the side of the machine upon which the cam plate 98 is mounted, and one arm of the plate 118 is provided with a cam roller 120 which operates as a cam follower on cam surfaces 106 and 108 of the plate 98.

Fixed upon the rock-shaft 80 and constrained to turn therewith is an arm 122 and, threaded through a lug 124 provided on plate 118 on the end of the latter remote from the roller 120, is an adjustable abutment screw 126 having thereon a lock nut 128 by means of which it may be locked in any adjusted position with reference to said lug. The abutment screw 126 is in the vertical plane of the arm 122 so that, during certain parts of a winding operation and, more particularly, of a web-severing and web-tucking operation, the upper end of the abutment screw 126 will abut a lower surface of the arm 122 and, when the cam-follower plate 118 is turned by cooperation with the cam surfaces 106, 108 as the riding-roll carriages 40 with the rock-shaft 80 move vertically, the cam-follower plate 118, through the mentioned abutment screw 126, operates to swing the arm 122 upwardly. That causes the shaft 80 to rock counterclockwisely, as viewed in most of the figures of the drawings, and causes said shaft to swing the suspension arms 81 outwardly and upwardly from their positions, as in FIGS. 1 and 5, to other positions as shown, for example, in FIGS. 2–4. To hold the arm 122 yieldably against the screw 126, a coil spring 130 under tension is arranged with its opposite ends hooked to or otherwise secured to the arm 122 and to a rigid pin 132 fixed into the end of the follower plate 118 which is remote from the cam roller 120.

The lifters 52, for lifting a filled core from its winding position on the drums 20, 22, are similarly carried at opposite ends of the machine. Each lifter is pivoted at 135 (FIG. 1) in a vertically guided frame 137 connected to an above riding-roll carriage 40 by a lost-motion link rod 139. The lower end of the link rod is suitably connected to the frame 137 by nuts 142 and extends upwardly, slidably through an integral lug 144 on the riding-roll carriage; and a collar 146 is adjustably fixed upon the link rod, above the lug 144, by a set screw 148. The lifters 52 cannot pivot downwardly from lifting position as shown in FIG. 1; however, they are capable of pivoting upwardly upon engagement with a subsequently inserted core, upon downward movement of the frame 137, to project under and later lift the latter core in a subsequent operation of the machine.

To understand the operation of the disclosed tucking means, not only for tucking purposes but also for cooperation with the knife 72 for web-severing purposes, it should be understood that, during a winding operation, the riding roll 38 rests upon the core 36N or, more properly, upon web material being wound upon that core so that, during the winding operation, the riding roll rises and, likewise, its carriage 40 rises with the principal parts of the described tucking means which are mounted thereon.

The mentioned rising movement occurs as a result of the increase in diameter imparted to the core by the accumulation of web material thereon. Then, when the desired amount of web material has accumulated on the core 36N constituting the latter a filled core 36F, the drums 20 and 22 are stopped by stopping of the motors which turn them and, at about the same time, the riding roll 38 is lifted by means of suitable motors (not shown) which operate to pull upwardly on cables 134 which are fixed to the two riding-roll carriages 40 at opposite sides of the machine (only one such cable being shown in the drawing).

As the riding roll 38 is thus lifted from the filled core, continuation of such lifting causes the frame 137 and lifters 52 to be raised to engage the latter underneath opposite end portions of the core which protrude beyond the web material wound thereon; and further continued upward movement of the riding-roll carriages 40 causes the riding roll 38 and the filled core to move vertically upwardly in unison until said core is in a sufficiently elevated position that unload arms 46 may swing inwardly to bring their slots 50 directly underneath the ends of said filled core.

Immediately after the unload arms reach their inward position, the riding-roll carriages 40 and the related lifter frames 137 are motor-lowered to deposit the filled core in the slots 50. Then, the unload arms carry the filled core (now designated 36F), to an approximately half-out position as shown in FIGS. 1–5. Meanwhile, the load arms have moved to a full-in position in the machine and have deposited a new core 36N between and upon the drums 20, 22 in winding position, at which time the new core 36N and the filled core 36F are relatively positioned approximately as shown in FIG. 2; and the riding roll 38 and the tucking rollers 76 and 78, although somewhat lowered from their uppermost position, are, nevertheless, still somewhat above the new core as shown in said figure.

Further descent of the riding roll and the tucking rollers initiates the automatic tucking function of this invention now to be described. This further descent, caused by resumption of operation of the motor means for operating the carriages 40, causes the cam-follower plate 118 to be pivoted counterclockwisely (as viewed in FIG. 2) by cam surface 106, the tucking rollers 76, 78, meanwhile moving downwardly and clearing the filled core 36F (the cam plate 98, of course, being in a proper adjusted position to provide such clearance); and then engaging the intervening portion of the web which extends between the core 36N and the filled core or rewind roll 36F to push that web portion downwardly, as in FIG. 3, into engagement with knife edge 74 to cut the web and into engagement with glue brush 68 to apply glue at 60, across the trailing end of the web on the filled core.

At about the time that the downwardly moving tucking rollers reach their mentioned web-cutting positions, the riding roll 38 will have come to rest on the new core 36N and the core lifters 52 will have descended to similar lifting positions underneath the ends of the new core, pivoting upwardly as they move downwardly past the new core and then pivoting by gravity to their lifting attitudes as shown in FIG. 1, in condition to repeat a lifting operation, in the manner described, upon the overlying core after the latter has received its quota of web material.

After the web has been severed and while the various parts of the machine remain as illustrated in FIG. 3, the parts of the web assume positions somewhat as shown in FIG. 4. Immediately upon severance of the web, however, the operation of the machine is such that the load arms 62, having placed the new core in winding position, start swinging outwardly or clockwise as a result of which action they cause the suspension arms 81 to swing outwardly and upwardly, as indicated in FIG. 4, this swinging action occurring as a result of coaction of a cam member 136 fixed upon one of the load arms at one end of the machine and a cylindrical cam-follower surface 138 formed at a corresponding end and near the bearing of the tucking roller 76. This cam arrangement is such that the cam member 136, as the load arms 62 swing outwardly, raises the tucking roller 76 above and clear of the cutting edge of the knife 72, thereby avoiding possible damage to the knife or the tucking rollers at that stage of operation.

After the load arms 62 have moved outwardly to the extent that the cam member 136 clears the cylindrical cam-follower surface 138, the suspension arms 81 swing downwardly and inwardly by gravity and bring the tucking roller 76 down upon the then leading portion LW of the web which is about to commence being wound upon the new core 36N. In this manner, the tucking rollers 76, 78 assume tucking positions, as indicated in FIG. 5, in which roller 76 presses against a web portion which, in turn, is pressed against the new core 36N and tucking roller 78 rests upon a portion of the web nearer to its leading edge, which portion is held or pressed downwardly by the roller 78 against an underlying portion of web being fed to the machine around drum 20.

Up to this point, during the period following the completion of winding on the previously filled core 36F, the motors which drive the drums 20 and 22 during the winding operation are inactive and said drums are stationary. However, immediately after the engagement of the tucking rollers 76 and 78 with the several mentioned web portions and the consequent pressing of the latter against the new core 36N and the drum 20, a winding operation is resumed by starting of the motors which operate the drums 20 and 22. During the slow initial rotation of the drums and the new core 36N, the latter being frictionally driven by the drums, the tucking roller 76 is frictionally driven by the new core and the tucking roller 78 is frictionally driven by the winding drum 20, these rollers 76, 78, as a result, rotating in the directions indicated by the arrows applied thereto in FIG. 5.

It will be seen that at the commencement of a new winding operation and considering the rollers as viewed in FIG. 5, tucking roller 78, by rotating clockwise against the leading end of the web, tends to push that end of the web toward the core 36N, while tucking roller 76, by rotating counterclockwise against the web portion on the core 36N, tends to push the latter web portion downwardly. This urging of the web downwardly by roller 76 and inwardly or leftwardly by roller 78 induces the formation of a bight 140 in the adjacent portion of the web and, as the rotation of the winding drum 20 and new core 36N continues, the bight is forcibly tucked into place at a nip area between the core 36N and the portion of the incoming web which is moving from the drum 20 to said core. Once the bight 140 is thus tucked into place underneath the incoming web, it and the leading-end portion of the web are held firmly against the core by the incoming web and continuation of the winding operation results in proper winding of the web material on the core without the need of using any adhesive.

As the new winding operation continues, the accumulation of web material on the new core 36N raises the riding roll 38 and its carriages 40, thereby causing surfaces 108 and 106 of cam plate 98 to swing and hold suspension arms 81, with the tucking rollers, outwardly through the medium of the cam-follower plate 118. Continued winding, roll changing, cutting, gluing and tucking proceed in the manner already described.

The tucking roller arrangement, hereinbefore described and referred to as the first embodiment of this invention, illustrated in FIGS. 1–7, is disclosed and claimed in my copending application Serial No. 316,692 filed October 16, 1963, which is a division hereof.

The second embodiment, illustrated in FIGS. 8–11, differs from the previously described first embodiment chiefly in that an elongate, horizontal tucking brush 160 is employed in place of tucking rollers. Incidental to the use of this tucking brush, there exists a problem of guiding it into tucking position against a leading-end portion of a web on a new core 36N. This problem is solved by the use of novel brush supporting and actuating assemblies hereinafter detailed.

Figure 11:
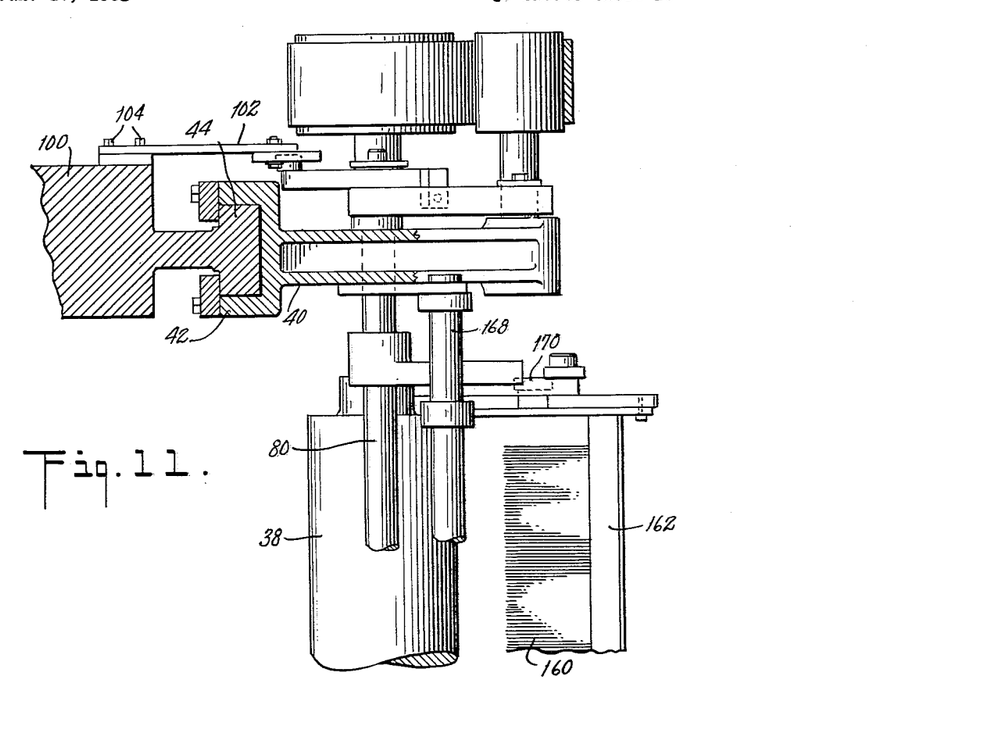
FIG. 11 is an enlarged view corresponding substantially to the upper part of FIG. 6 but illustrating parts of the second embodiment.

The bristles constituting the brush 160 are set into or affixed to an elongate rigid back 162 which is similarly supported at its opposite ends by similar quadrangular brush supporting and actuating assemblies carried at opposite sides of the machine on the two similar riding-roll carriages 40 (only one of the latter being shown in FIG. 11). For the purpose of this description of the second embodiment, reference characters already employed in describing the first embodiment are used upon the same parts to indicate identical parts in the second embodiment.

Each of the mentioned quadrangular assemblies comprises a first or brush-carrying link 164, the ends of the brush back 162 being rigidly mounted on such first links at opposite sides of the machine. Each quadrangular assembly further comprises one of the suspension arms 81, as a second link and also a third link 166. The latter is pivoted at its upper end upon a cross-rod 168 which has its ends fixed to the riding-roll carriages 40 at opposite ends of the machine. The lower end of link 166 is pivoted to one end of link 164 and the other end of the latter is pivoted to the lower end of slide member 86 of suspension arm 81. As the axes of both the cross-rod 168 and the rock-shaft 80 are in fixed relation to the carriages 40 and to each other, the intervening portions of said carriages constitute non-pivotal, fourth links of the quadrangular assemblies.

As the slide members 86 are adjustably slidable and lockable in the lower portions of the elbows 82 of the suspension arms 81, as already explained in the description of the first embodiment, the length of the second link of each quadrangular assembly may be varied to achieve desired direction of the brush 160 in operation as hereinafter described. In each quadrangular assembly, a roller 170 carried in a mounting lug 172, attached upon the inside of slide member 86 near the latter's lower end, is arranged to roll upon a cam member 136a on adjacent load arm 62a.

The arm 122, already described fully in detail in relation to its functioning in the first embodiment, performs an additional function in the second embodiment, to wit; it positively limits the extent to which the tucking brush 160 may move to tucking position. For this purpose, an abutment link 174 is freely pivoted at its one end to the arm 122 at or near the latter's free end. The link 174 has a pin 176 fixed therein, protruding from one side thereof.

When the machine is equipped with the two tucking rollers 76, 78 for tucking purposes, the link 174 is swung up to inoperative position, as shown in the illustrations of the first embodiment, in which position it is held by the pin 176 which rests upon the upper edge of the arm 122.

Figure 8:
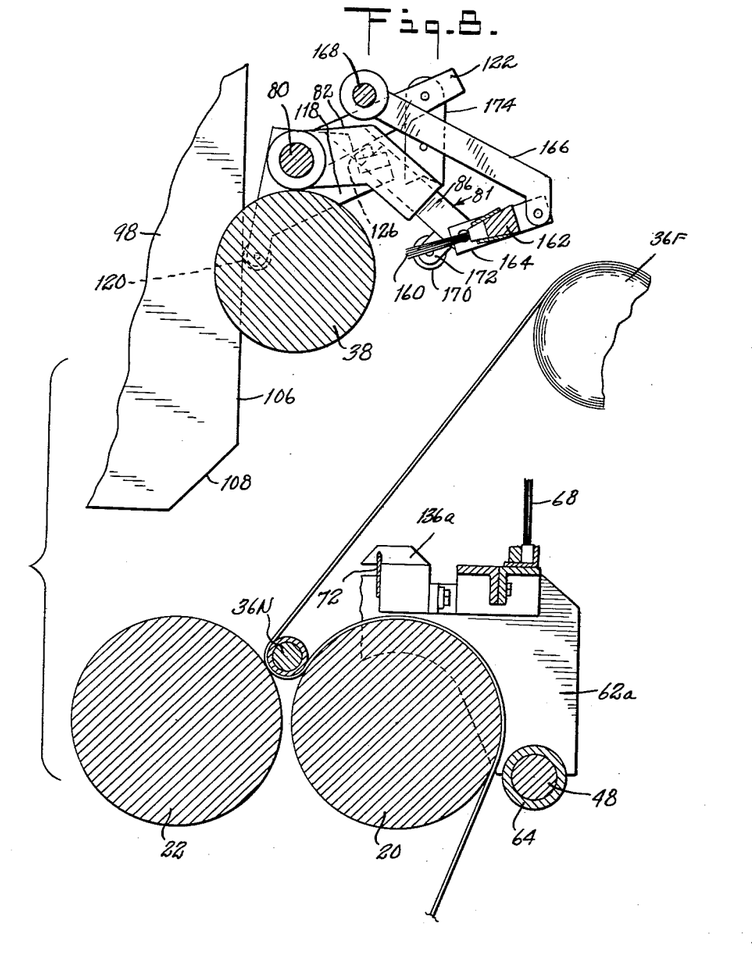
FIGS. 8, 9 and 10 diagrammatically illustrate a second embodiment of this invention; and the positions of parts shown therein substantially correspond, respectively, to the positions of corresponding or equivalent parts as shown in FIGS. 2, 3 and 5.
Figure 9:
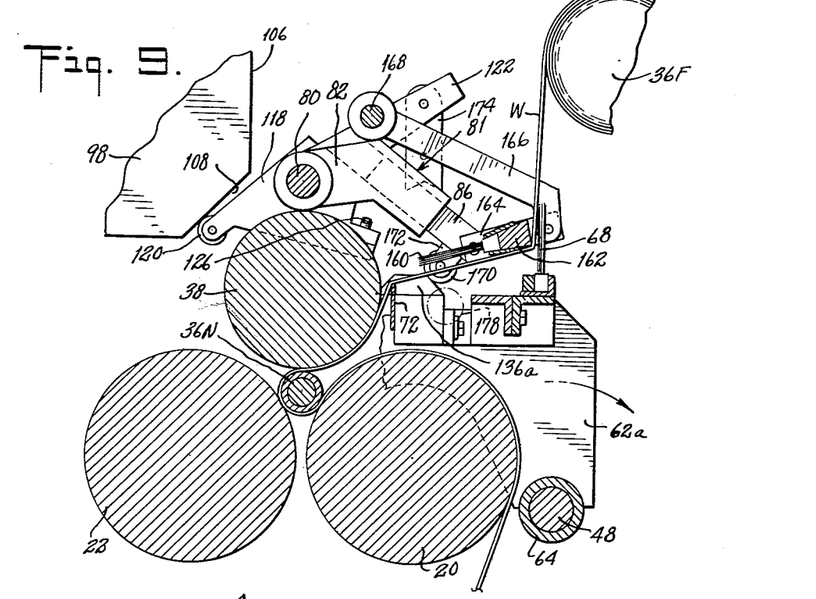
Figure 10:
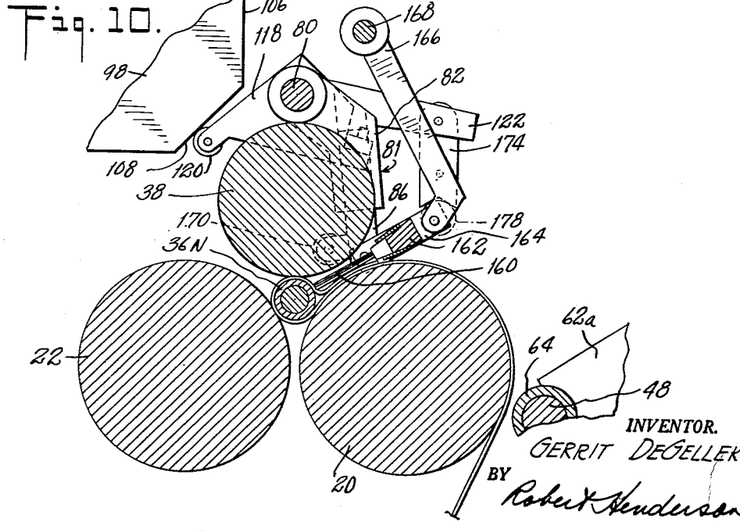

On the other hand, when the machine is equipped with the tucking brush 160, the link 174 is swung clockwisely (as viewed, e.g., in FIGS. 12 and 8) to its freely depending or operative position, as shown in FIGS. 8–10, in which, when the brush 160 reaches its predetermined tucking position as in FIG. 10, the lower or free, recessed end of the link 174 comes into abutment with a suitable stationary lug or abutment member 178 fixed in a proper position upon the frame or other stationary part of the machine. As both the arm 122 and the suspension arms 81 are constrained to turn with the rock-shaft 80, it follows that abutment of the lower or free end of link 174 with the member 178 serves to limit inward swing of the suspension arms 81 and thereby limit inward movement of the brush 160.

Although the foregoing description may suffice to afford an understanding of the operation of the second embodiment, it may aid, in affording a clear understanding, to detail such operation without repeating the description of operation of the winding and core-changing mechanism.

It may be assumed that the link 174 has been swung to its depending or operative position and that the various other parts are in positions as shown in FIG. 8. During initial motor lowering of the riding roll 38, cam-follower plate 118, through rolling of its roller 120 upon approximately vertical cam surface 106, serves through its abutment screw 126 to hold up arm 122 and thereby hold the brush and its supporting links approximately in their positions as in FIG. 8.

At about the time that the back 162 of the tucking brush, in the latter's descent, engages the web portion which extends between the new and the filled cores 36N and 36F, the roller 120 moves onto and downwardly along the receding cam surface 108 thereby permitting the plate 118 to turn clockwisely to its FIGS. 9 and 10 position in which said plate's abutment screw 126 is sufficiently clear of the arm 122 to permit the latter to swing downwardly to the extent permitted by interaction of the abutment link 174 and the abutment member 178.

This latter downward swing of arm 122 does not immediately occur, however, because the descending brush and its supporting linkage are held up by engagement of roller 170 with cam member 136a and with a portion of load arm 62a after riding downwardly upon said cam member. This downward riding brings the brush back 162 and the links 164 and 166 and arms 81 slightly lower than shown in FIG. 9 whereupon the knife 72 severs the web in the same manner as already described. Then, the load arms swing outwardly and pivot the brush-carrying assembly and the brush 160 upwardly and outwardly until the cam 136a passes underneath and clears the roller 170, whereupon the brush-carrying assembly swings downwardly until link 174 seats upon abutment member 178 to limit inward movement of brush 160 to its tucking position as shown in FIG. 10.

In its tucking position, the underside of the tucking brush may bear upon the leading end portion of the severed web and the bristle ends of the brush may bear against a web portion on the new core 36N, the degree or forcefulness of this bearing of the brush upon the web being controlled partly by the abutment of link 174 with abutment member 178 and partly by the adjusted position given to slide members 86 in suspension arms 81.

After the tucking brush reaches its tucking position, the formation of a bight in the web and tucking-in of the bight proceeds, upon resumption of winding rotation of the drums 20, 22, in much the same way as already described with respect to the tucking rollers 76, 78 of the first embodiment. As new core 36N resumes clockwise rotation upon resumption of a winding operation, bristle-end portions of the tucking brush flex downwardly to some extent to form positively the mentioned bight in the web.

As with the tucking rollers of the first embodiment, the brush 160 rises with accumulation of web material on the new core, the brush-supporting assembly with said brush, meanwhile, being pivoted outwardly by cam 98 and cam plate 118 to condition the described apparatus for a similar, succeeding tucking operation.

It will be clear to those familiar with web-winding machines that the present concept relating to web-tucking means may be utilized in various ways other than herein disclosed without, however, departing from this invention.

I claim:

1. A winding machine comprising a driven, cylindrical, winding drum, a rotatable, cylindrical, rewind core supported in frictional driving relation to said drum to derive rotation therefrom to draw elongate web material through a nip area between said drum and core at a web-receiving side thereof, a rotatable riding roll adapted to bear against said core and to coact with said drum and core to hold part of a leading portion of the web material intimately upon the core, a further part of said leading web portion being in a position extending from said riding roll toward said winding drum and across said web-receiving side of the drum and core, an elongate tucking brush having a substantially rigid back and a laterally flexible brushing portion, and supporting means holding said brush in parallelism with the winding surface of said core with said brushing portion directed toward the core; said brush being movable toward said core and said supporting means guiding the brush in such movement, and said brushing portion, upon such movement of the brush, engaging said further part of the leading web portion, in the latter's said position, and pushing it against the core, and, in response to rotation of the core at the start of a web-winding operation, flexing toward said drum while continuing to hold the web material against the core, to push said material into said nip area between said drum and core at said web-receiving side thereof.

2. A winding machine according to claim 1, said supporting means comprising a pair of similar quadrangular assemblies each including a non-pivotal link, a pair of swinging links pivotally connected separately at first pivot points thereof to spaced points on said non-pivotal link, and a carrier link having opposite ends pivotally connected to second pivot points of said swinging links distal from said first points; and the back of said tucking brush being connected, at its opposite ends, to the carrier links of said assemblies.

3. A winding machine according to claim 2, said back of the brush being rigidly connected, at its opposite ends, to the carrier links of said assemblies.

4. A winding machine according to claim 2, further comprising means on one of said swinging links of each of said assemblies for adjusting the length thereof to afford means for varying the attitude pursued by said brush in its movement toward said core.

5. A winding machine according to claim 1, further comprising a vertically movable carriage adapted to carry and move said riding roll above and in a vertical plane parallel to the axis of rotation of said core, said supporting means comprising a pair of arms pivotally connected to said carriage with said brush connected between the swinging ends of said arms, and cam means including a fixed cam member and a bell crank; the latter being pivoted upon said carriage, and having one arm coacting with said cam member to derive pivotal movement therefrom and a second arm coacting with said pair of arms during initial downward movement of said carriage and riding roll to hold said pair of arms and brush in a non-tucking position away from said core and coacting with said pair of arms during later downward movement of said carriage and riding roll to free said pair of arms and brush to swing toward said core to a tucking position.

6. A winding machine according to claim 5, said pair of arms being parts of a quadrangular assembly coacting with said brush to control and limit rotary movement of the brush during its movement from non-tucking to tucking position.

References Cited in the file of this patent

UNITED STATES PATENTS

| | | |
|---|---|---|
| 2,200,000 | Johnstone | May 7, 1940 |
| 2,361,264 | Christman | Oct. 24, 1944 |
| 2,585,227 | Christman | Feb. 12, 1952 |
| 2,586,833 | Kohler et al. | Feb. 26, 1952 |
| 2,670,152 | Priest | Feb. 23, 1954 |
| 2,682,379 | Piper et al. | June 29, 1954 |
| 2,787,427 | Marczincsin | Apr. 2, 1957 |
| 3,030,042 | Gelleke | Apr. 17, 1962 |